United States Patent
Solihin

(10) Patent No.: US 8,244,986 B2
(45) Date of Patent: Aug. 14, 2012

(54) DATA STORAGE AND ACCESS IN MULTI-CORE PROCESSOR ARCHITECTURES

(75) Inventor: Yan Solihin, Apex, NC (US)

(73) Assignee: Empire Technology Development, LLC, Wilmington, DE (US)

( * ) Notice: Subject to any disclaimer, the term of this patent is extended or adjusted under 35 U.S.C. 154(b) by 266 days.

(21) Appl. No.: 12/649,659

(22) Filed: Dec. 30, 2009

(65) Prior Publication Data

US 2011/0161346 A1    Jun. 30, 2011

(51) Int. Cl.
    *G06F 13/00* (2006.01)
(52) U.S. Cl. .......................... 711/148; 711/146
(58) Field of Classification Search .................. None
    See application file for complete search history.

(56) References Cited

U.S. PATENT DOCUMENTS

| | | |
|---|---|---|
| RE32,900 E | 4/1989 | Orsic |
| 6,959,374 B2 | 10/2005 | Schulz |
| 7,225,300 B1 | 5/2007 | Choquette et al. |
| 7,552,241 B2 | 6/2009 | Ramey |
| 7,626,588 B1 | 12/2009 | Molnar et al. |
| 7,640,399 B1 | 12/2009 | Lepak et al. |
| 7,853,755 B1 | 12/2010 | Agarwal et al. |
| 7,975,109 B2 * | 7/2011 | McWilliams et al. ........ 711/147 |
| 7,987,321 B1 | 7/2011 | Agarwal et al. |
| 2003/0140200 A1 | 7/2003 | Jamil et al. |
| 2005/0044340 A1 * | 2/2005 | Sheets et al. ................. 711/206 |
| 2005/0076181 A1 | 4/2005 | Hsu |
| 2006/0143384 A1 | 6/2006 | Hughes et al. |
| 2006/0265552 A1 | 11/2006 | Davis et al. |
| 2007/0226425 A1 | 9/2007 | Caprioli et al. |
| 2009/0031085 A1 * | 1/2009 | Carpenter et al. ............ 711/146 |
| 2009/0031086 A1 * | 1/2009 | Carpenter et al. ............ 711/146 |
| 2009/0274413 A1 | 11/2009 | Beausoleil et al. |
| 2010/0241811 A1 | 9/2010 | Solihin |
| 2010/0274971 A1 | 10/2010 | Solihin |

FOREIGN PATENT DOCUMENTS

EP    1 376 368 A2    1/2004

OTHER PUBLICATIONS

"Efficient Cooperative Caching using Hints" (1996) Prasenjit Sakar et al., University of Arizona.
"Cooperative Caching for Chip Multiprocessors" (2006) Jichuan Chang et al., University of Wisconsin-Madison.
"Virtual Hierarchies to Support Server Consolidation" (2007) Michael R. Marty et al., University of Wisconsin-Madison.

(Continued)

*Primary Examiner* — Edward Dudek, Jr.
*Assistant Examiner* — Sean D Rossiter

(57) ABSTRACT

Technologies are generally described for a system for sending a data block stored in a cache. In some examples described herein, a system may comprise a first processor in a first tile. The first processor is effective to generate a request for a data block, the request including a destination identifier identifying a destination tile for the data block, the destination tile being distinct from the first tile. Some example systems may further comprise a second tile effective to receive the request, the second tile effective to determine a data tile including the data block, the second tile further effective to send the request to the data tile. Some example systems may still further comprise a data tile effective to receive the request from the second tile, the data tile effective to send the data block to the destination tile.

25 Claims, 10 Drawing Sheets

OTHER PUBLICATIONS

"Victim Replication: Maximizing Capacity while Hiding Wire Delay in Tiled Chip Multiprocessors" (2005) Michael Zhang et al., IEEE.
PCT International Search Report PCT/ISA/210 for PCT/US10/50144 dated Aug. 22, 2011.
PCT Written Opinion of the International Searching Authority PCT/ISA/237 for PCT/US10/50144 dated Aug. 22, 2011.
AMD, "AMD 64 Architecture Programmer's Manual vol. 2: System Programming," Publication# 24593, Rev. 3.14, Sep. 2007.
Chang, J. et al., "Cooperative Cache Partitioning for Chip Multiprocessors," Proc. Of 21st annual Intl. Conf. on Supercomputing, ACM, pp. 11, 2007.
Chao, Lin, "Meet the Intel ® Core ™ Duo Processor," Intel Technology Journal, vol. 10(2), May 15, 2006.
Chaudhuri, M. et al., "The Impact of Negative Acknowledgements in Shared Memory Scientific Applications," IEEE Transactions on Parallel and Distributed Systems, vol. 15 (2), pp. 134-150, Feb. 2004.
Guo, F., et al., "A Framework for Providing Quality of Service in Chip Multi-Processors," Proc. of the 40th Annual IEEE/ACM Symposium on Microarchitecture, pp. 13, Dec. 1-5, 2007.
Hsu et al., "Communist, Utilitarian, and Capitalist Cache Policies on CMPs: Caches as a Shared Resource," Proc. of the 15th Intl. Conf. on Parallel Architectures and Compilation Techniques, ACM, pp. 10, (2006).
Iyer, R., et al., "QoS Policy and Architecture for Cache/Memory in CMP Platforms," Proc. of the ACM Sigmetrics Conference on Measurement and Modeling of Computer Systems, ACM, pp. 12, Jun. 12-16, 2007.
Kim, S., et al., "Fair Cache Sharing and Partitioning on a Chip Multiprocessor Architecture," 13th International Conference on Parallel Architecture and Compilation Techniques, pp. 12, (2004).
Nesbit, K.J., et al., "Virtual Private Caches," Proc.of the 34th Intl. Symp. on Computer Architecture, ACM, pp. 12, Jun. 9-13, 2007.
Qureshi, M.K., et al., "Utility-Based Cache Partitioning: a Low-Overhead, High-Performance, Runtime Mechanism to Partition Shared Caches," Proc. of the 39th IEEE/ACM Intl. Symp. on Microarchitecture, pp. 10, Dec. 2006.
Suh, G.E., et al., "Analytical Cache Models with Applications to Cache Partitioning," in Proc. of the 15th Intl. Conf. on Supercomputing, ACM, pp. 12, Jun. 2001.
International Search Report and Written Opinion for International Patent Application No. PCT/US2010/50144 mailed on Aug. 22, 2011.
U.S. Office Action dated Aug. 18, 2011 in U.S. Appl. No. 12/408,075.
U.S. Notice of Allowance dated Dec. 19, 2011 in U.S. Appl. No. 12/408,075.
U.S. Notice of Allowance dated Oct. 3, 2011 in U.S. Appl. No. 12/428,563.

* cited by examiner

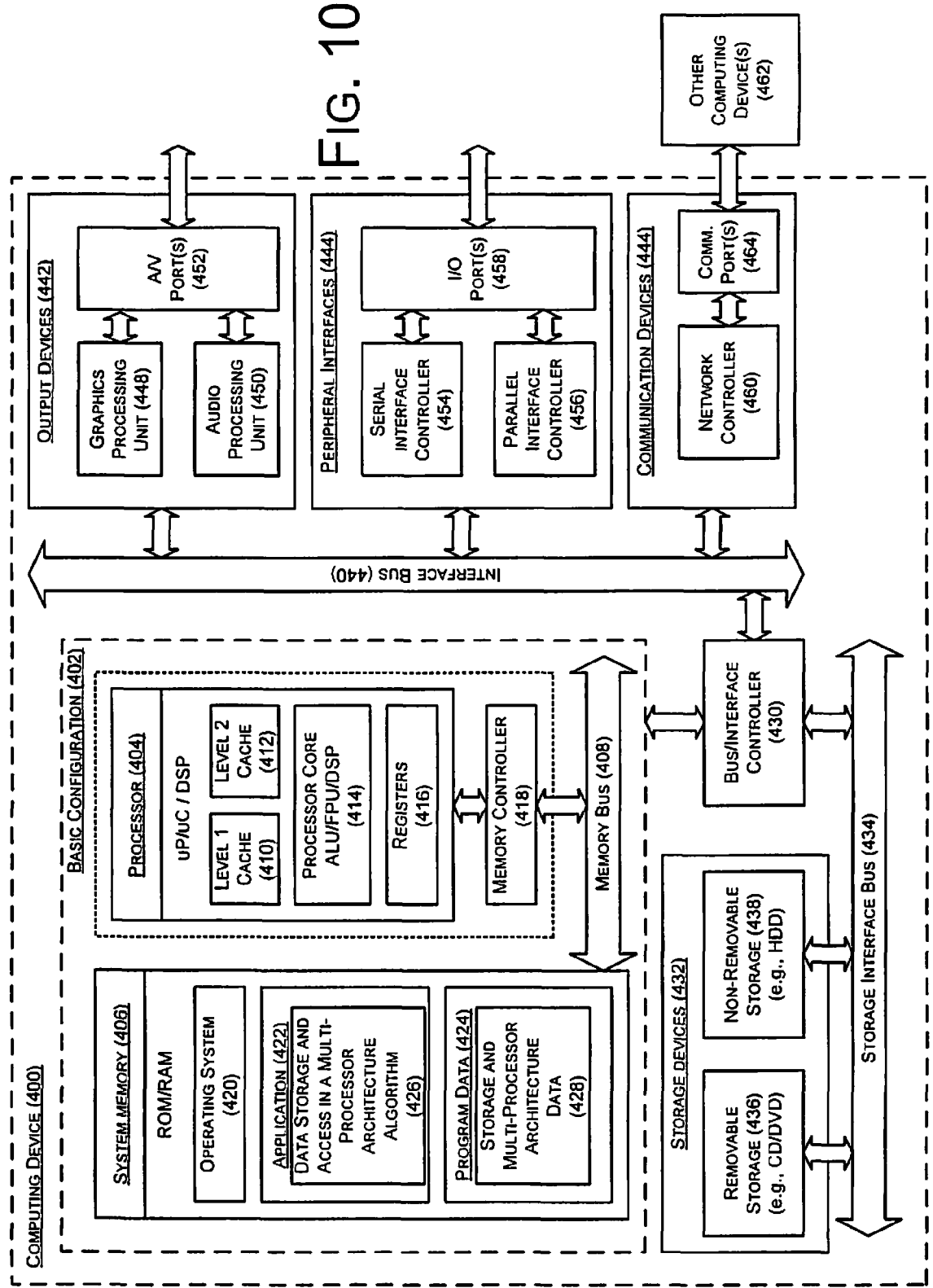

US 8,244,986 B2

DATA STORAGE AND ACCESS IN MULTI-CORE PROCESSOR ARCHITECTURES

BACKGROUND

Unless otherwise indicated herein, the materials described in this section are not prior art to the claims in this application and are not admitted to be prior art by inclusion in this section.

In multi-core processor architectures, multiple processor cores may be included in a single integrated circuit die or on multiple integrated circuit dies that are arranged in a single chip package. A cache may be used to store data for access by one or more of the processor cores. The data can be a subset of data stored in a larger memory that is typically located outside of the die. Each processor may be provided with a cache that stores data for the processor. As a single piece of data may be stored in multiple caches, a cache coherence protocol may be configured to keep track of the data stored in multiple caches. The cache coherence protocol is configured to help ensure that multiple requests for data consistently result in the same data being returned.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 10 shows a schematic diagram illustrating an example computer program product that includes a computer program for executing a computer process on a computing device for performing data storage and access in a multi-core processor architecture;

Figure 1:
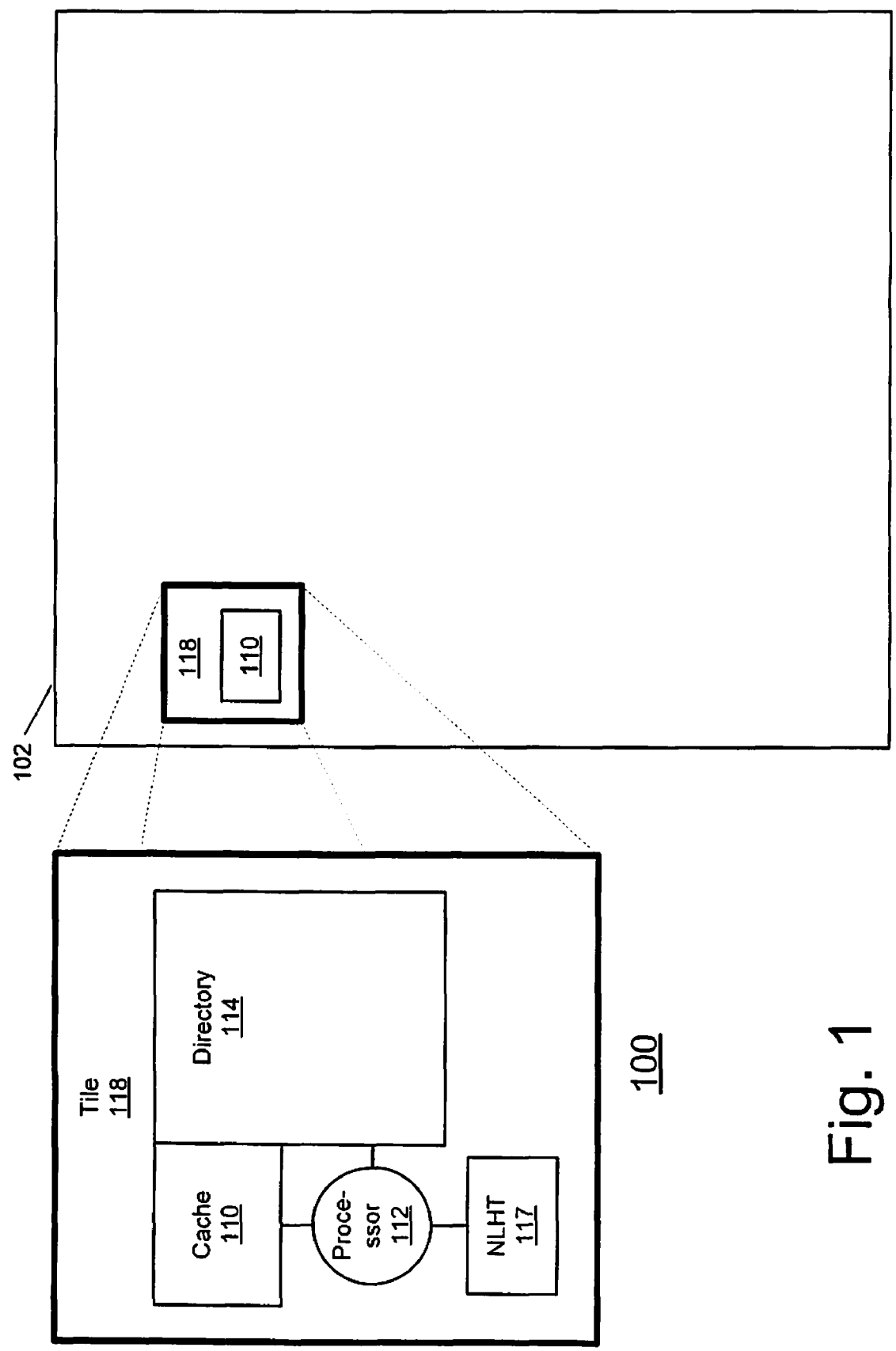
FIG. 1 illustrates an example system that can be utilized to implement data storage and access in a multi-core processor architecture.

all arranged according to at least some embodiments presented herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to performing data storage and access in multi-processor architectures.

Briefly stated technologies are generally described for a system for sending a data block stored in a cache. In some examples described herein, a system may comprise a first processor in a first tile. The first processor is effective to generate a request for a data block, the request including a destination identifier identifying a destination tile for the data block, the destination tile being distinct from the first tile. Some example systems may further comprise a second tile effective to receive the request, the second tile effective to determine a data tile including the data block, the second tile further effective to send the request to the data tile. Some example systems may still further comprise a data tile effective to receive the request from the second tile, the data tile effective to send the data block to the destination tile.

FIG. 1 illustrates an example system that can be utilized to implement data storage and access in a multi-core processor architecture, arranged in accordance with at least some embodiments described herein. An example system 100 may include a die 102 including a plurality of tiles. One tile 118 is shown for simplicity. Each tile 118 may include a cache 110, a processor or processor core (hereinafter referred to as "processor") 112, a directory 114, and a near location hint table (NLHT) 117. Processor 112 may be adapted to process data including code (hereinafter both data and code referred to as "data block"). Cache 110 may be configured to store a data block local to processor 112.

As is described in more detail below, when processor 112 requests to access a data block, such as write to or read from a data block that is stored in another tile, processor 112 may initiate a request that the data block be stored in a cache in a neighbor or adjacent tile close to tile 118. Thereafter, when processor 112 in tile 118 initiates another request to read from or write to the stored data block, the stored data block can be more quickly accessed.

An example near location hint table 117 may include an index of caches in neighboring tiles that are each storing data used by processor 112 in tile 118. Processor 112 may be configured to search near location hint table 117 to see if requested data blocks are stored in a cache of a neighboring tile.

Directory 114 may be a directory that identifies (e.g., indexes) a location associated with each data block that is stored in all of the tiles of die 102. Directory 114 may be located in a single tile on die 102 or distributed among many or all tiles. If the requested data block is not indexed in near location hint table 117, processor 112 may search directory 114, which may be in another tile, for the requested data block.

Figure 2:
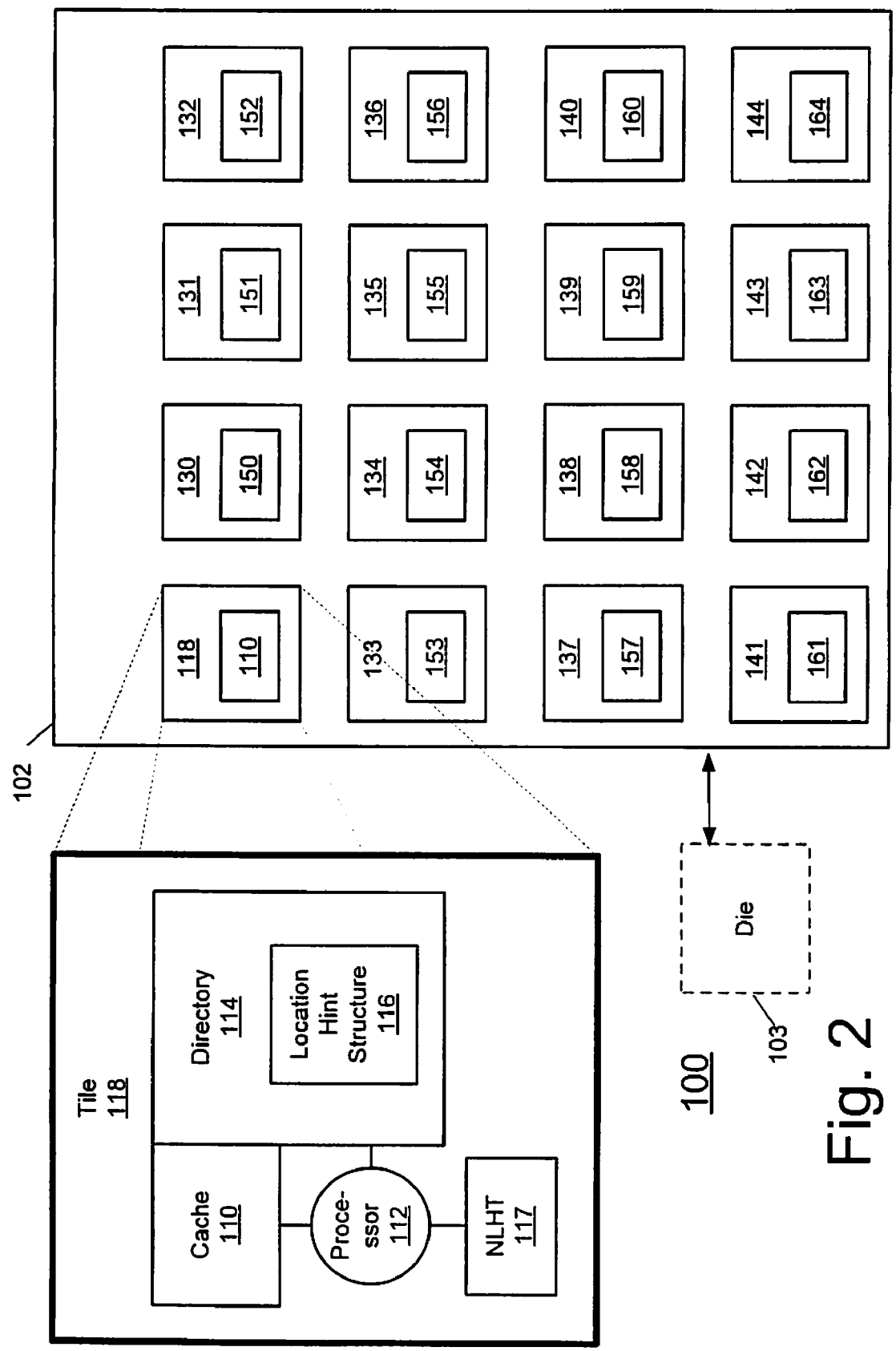
FIG. 2 illustrates an example system that can be utilized to implement data storage and access in a multi-core processor architecture.

FIG. 2 illustrates an example system that can be utilized to implement data storage and access in a multi-core processor architecture arranged in accordance with at least some embodiments described herein. FIG. 2 is substantially similar to system 100, with additional details. Those components in FIG. 2 that are labeled identically to components of FIG. 1 will not be described again for the purposes of clarity.

As illustrated in FIG. 2, die 102 may include a matrix (e.g., array) of tiles 118, 130-144 including respective caches 110, 150-164. Each tile may also include one or more of a respective processor 112, directory 114, location hint structure 116, and/or near location hint table 117. Only contents of tile 118 are shown for simplicity. Each tile in die 102 may be substantially the same as in a homogenous arrangement or some tiles may be different as in a heterogeneous arrangement. Die 102 may be arranged in communication with another die 103 so that data may be shared among a plurality of dies.

Directory 114 may be distributed among tiles or centralized in one tile. If directory 114 is distributed, for example, a first range of addresses (such as 0x0000-0x1000) may be stored in a first tile, a second range of addresses (such as 0x1001-0x2000) stored in a second tile, etc. Directory 114 in the figure thus may illustrate a first portion of an entire die directory where that first portion may be stored in tile 118 and additional portions may be stored in other tiles such as tiles 130, 131, 132, etc. Near location hint table 117, location hint structure 116, and directory 114 may be, for example, data structures accessible by processor 112 or may be registers within processor 112.

Figure 3:
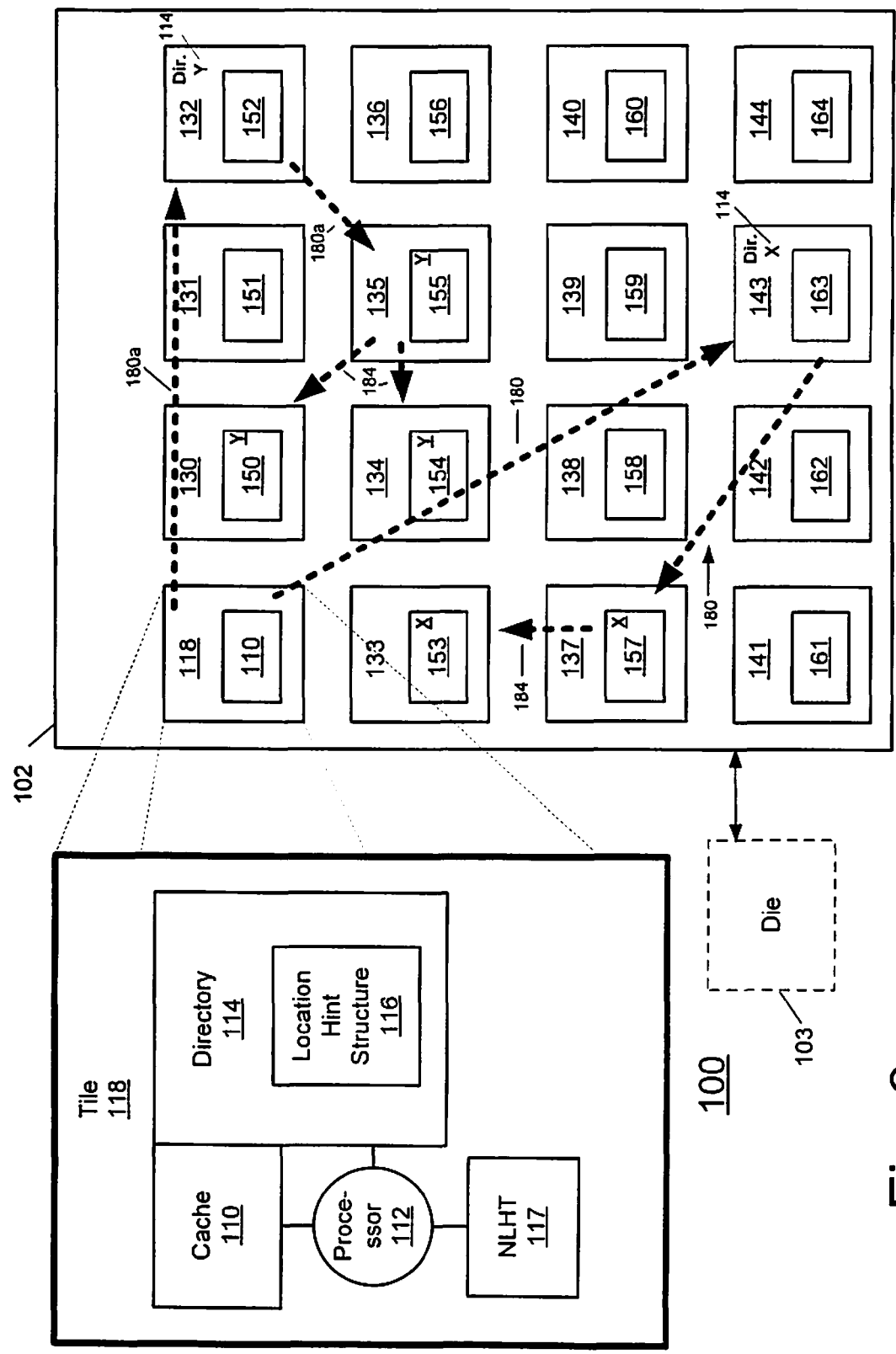
FIG. 3 illustrates an example system that can be utilized to implement data storage and access in a multi-core processor architecture.

FIG. 3 illustrates an example system that can be utilized to implement data storage and access in a multi-core processor architecture that is arranged in accordance with at least some embodiments described herein. Those components in FIG. 3 that are labeled identically to previously described components will not be described again for the purposes of clarity.

In the examples presented in FIG. 3, data may be stored in caches 110 in tiles 110, 150-164 or in caches in die 103. Processor 112 in a requesting tile 118 may be configured to request to access, such as read from and/or write to, data block X. A directory 114 for data block X may be stored in another directory tile 143. Tile 118 may be configured to send a request 180 to directory tile 143 for data block X. Request 180 can include a destination identifier that may include an identification of a destination tile, such as, for example, a neighboring or adjacent tile such as cache 150, 153 or 154 in neighboring tiles 130, 133, 134. In an example, tile 118 may request that data block X be sent to cache 153 in tile 133. The destination identifier may reference cache 153 or tile 133. For example, tiles may have access to a topology table indicating neighbor caches that are at distances from the tile of one network hop, two network hops, etc. Tiles may have a component that may be adapted to monitor whether the respective tile requires extra cache capacity. Tile 118 may be adapted to request that data block X be sent to a neighboring cache when extra cache capacity is needed.

In some examples, directory tile 143 may be configured to receive request 180, may search directory 114 in directory tile 143 and may determine a location where data block X is stored—for example cache 157. Tile 143 may be configured to then send request 180 to cache 157 in data tile 137. Tile 137 may be configured to send data block X to cache 153 in destination tile 133, from which data may be forwarded to the requesting processor 112 in tile 118. Transmission (or sending) of data block X to tile 133 may include a number of operations such as, for example, copying at least a part of the data block X, moving at least a part of the data block X, or some combination of copying or moving over time, etc. Moreover, read or write operations may include additional technical requirements for data communications such as asserting a read or write request line when address and/or data is available for communication over a bus, or by sending messages over an interconnection network, where the read/write operations may be either synchronous (e.g., clock based) or asynchronous (e.g., read/write acknowledge based).

Near location hint table 117 may track data location hints with a granularity that is the same as or different than a cache block. Near location hint table 117 can track a location of a cache block, a group of related cache blocks, a page, or other granularities. Table 117 is indexed by the data address based on the tracking granularity, and points to the destination tile that may store the data Larger granularities may reduce the table size used to track, while smaller granularities allow a more flexible placement of data in different destination tiles. Coherence correctness may be maintained by the directory and a cache coherence protocol. In some examples, if an entry in table 117 has stale information such as when data is no longer in an indexed destination tile, performance may be impacted while coherence correctness may not be affected. Entries in the table may be replaced if the table overflows. If an entry in table 117 points to a neighbor tile as a destination for data at a granularity larger than a cache block, some blocks of the data may still be in the local cache, while other blocks may be located in the destination neighbor tile. When a block belonging to the particular data in the local cache is evicted, and the processor requests that block of particular data, the block may be fetched again, and the block may be placed in the destination tile. Thus, over time, blocks of the particular data will move from the local cache to the destination tile.

Figure 4:
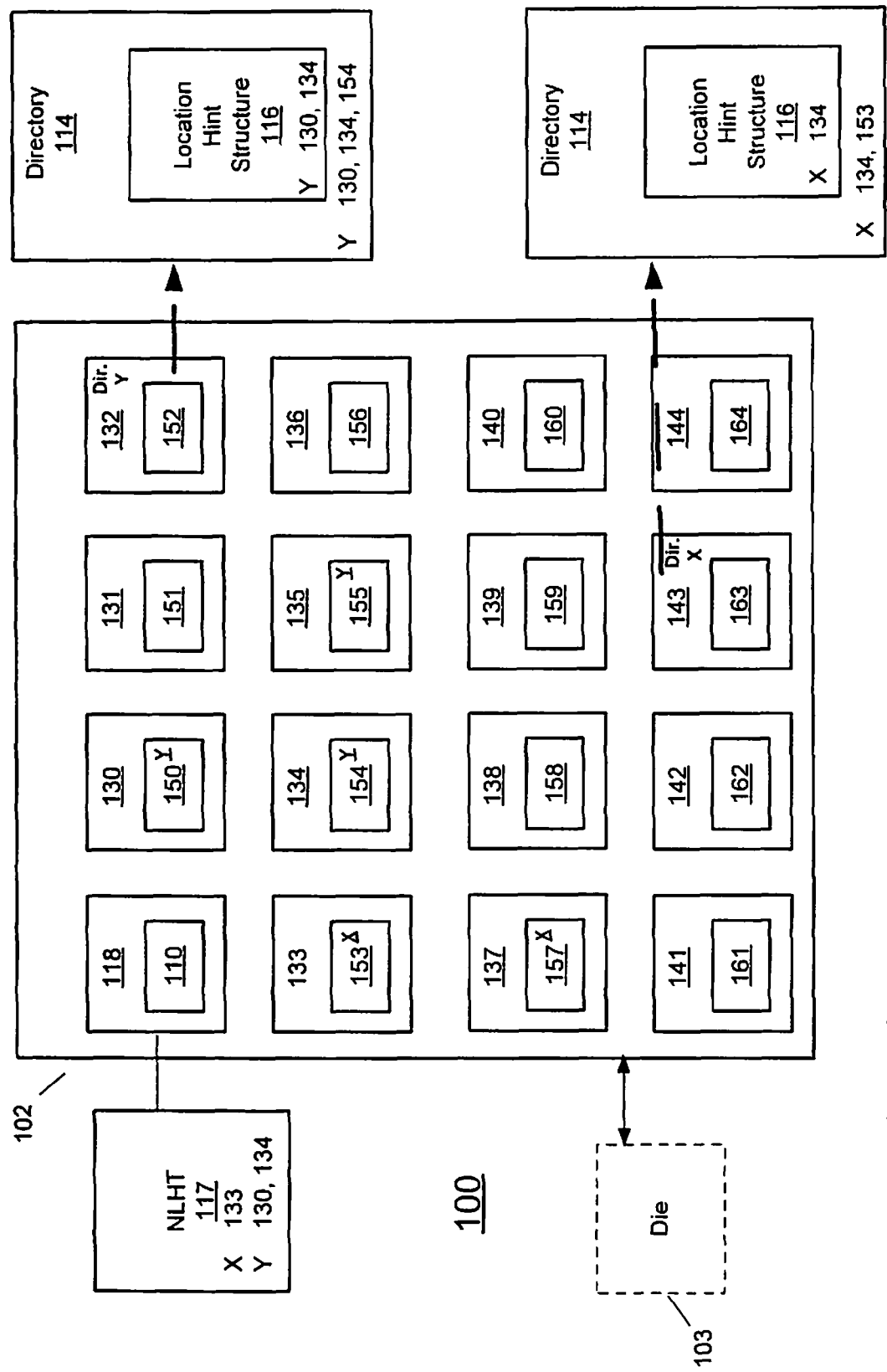
FIG. 4 illustrates an example system that can be utilized to implement data storage and access in a multi-core processor architecture.

FIG. 4 is a system diagram of a system which could perform data storage and access in a multi-processor architecture that is arranged in accordance with at least some embodiments described herein. Those components in FIG. 4 that are labeled identically to previously described components will not be described again for the purposes of clarity.

In the examples presented in FIG. 4, tile 118 may be configured to update new location hint table 117 stored in tile 118 to indicate that data block X is stored in tile 133 and data block Y is stored in tiles 130 and 134. New location hint table 117 provides hints to tile 118 that it will probably be beneficial to search for data in tile 133 first rather than the directory. When tile 118 is required to access data block X or data block Y, tile 118 may be configured to first search new location hint table 117, instead of the corresponding directory for X and Y, to determine which tile to send a request. This may result in quicker access to information identifying the cached locations of data blocks X and Y. New location hint table 117 may be more readily accessible as new location hint table 117 may be stored in local registers in tile 118. If new location hint table 117 does not include an entry for desired data block, or if tile 118 searches in the tile indicated in new location hint table 117, and the data block is not found, tile 118 may be configured to send a request to the tile with the applicable directory.

New location hint table 117 may track data location hints with a granularity that is the same as or different than a cache block. New location hint table 117 can track a location of a cache block, a group of related cache blocks, a page, or other granularities. Table 117 is indexed by the data address based on the tracking granularity, and points to the destination tile that may store the data. Larger granularities may reduce the table size used to track, while smaller granularities allow a more flexible placement of data in different destination tiles. Coherence correctness may be maintained by the directory and a cache coherence protocol. In some examples, if an entry in table 117 has stale information such as when data is no longer in an indexed destination tile, performance may be impacted while coherence correctness may not be affected. Entries in the table may be replaced if the table overflows. If an entry in table 117 points to a neighbor tile as a destination for data at a granularity larger than a cache block, some blocks of the data may still be in the local cache, while other blocks may be located in the destination neighbor tile. When a block belonging to the particular data in the local cache is evicted, and the processor requests that block of particular data, the block may be fetched again, and the block may be placed in the destination tile. Thus, over time, blocks of the particular data will move from the local cache to the destination tile.

Tile 143 may be configured to update directory 114 and location hint structure 116 to indicate that X is now stored in tile 133. Tile 132 may be configured to update directory 114 and location hint structure 116 to indicate that Y is now stored in tiles 130 and 134. An entry in location hint structure 116 conveys the location hint information to a processor that is required to read a block. In response to this information, the processor in the requesting tile may be configured to cache the data locally. Alternatively, if the destination tile is nearby, the processor can be configured to request storage of the data in the destination tile's cache. The processor can be configured to update its own new location hint table so that the processor searches this destination tile for future requests, before inquiring the directory. The location hint structure may be used for performance improvement and it does not have to have precise information. The location hint structure may be configured to keep track of all locations for a given data, or configured to not keep track of all locations. The directory keeps track of all possible locations for a given data block. If system 100 is designed to track the location of a data block at a block granularity, the directory can be used to provide such information. If system 100 is designed to track the location of a group of blocks, a page, or other granularities, then the location hint structure may be used.

In an example, when a tile such as tile 118 requests data block X from tile 143, tile 143 may be configured to first search location hint structure 116 for a location of data block X before searching the entire directory 114. The requesting tile (tile 118 or another tile) then has the option of searching in the tile indicated by location hint structure 116 or searching in directory 114. Location hint structure 116 may be within directory 114, outside directory 114, inside die 102 or outside die 102.

In some examples, caches 150, 153, 154 may be used by tile 118 to store data blocks that may not be able to fit in cache 110 of tile 118 or to store data blocks with a different priority level than the data block stored in cache 110. For example, a block with a higher probability of being accessed in the near future may have a higher priority. Blocks with higher priority than others may be placed as near to the processor as possible to minimize the latency to access them. For example, blocks with the highest priority levels may be placed in the local cache of the requesting tile, and slightly lower priority levels may be placed in the closest neighbor tiles. Having data stored in tiles physically close to tile 118 may yield many benefits. In one example, the placement of data blocks in physical proximity of tile 118 can reduce data access times for processor 112 of tile 118. In another example, the placement of data blocks may reduce overall die traffic on die 102, and/or may minimize cache misses thereby allowing data to be accessed that would otherwise become stale or paged out). Tile 118 may be configured to continuously request that data be sent to caches other than the cache of tile 118 by sending a destination identifier that does not correspond to the cache of tile 118. In some examples, tile 118 may be configured to request that data blocks are sent to cache 110 by making the destination identifier correspond to cache 110. In some examples, the requesting processor may be inhibited from requesting more than a threshold of data be stored in a cache of a different tile. In this way, local data needed by the processor in this different tile is not negatively impacted.

As discussed previously, when tile 118 is required to access data block X, tile 118 may be configured to search new location hit table 117 for the cache storing data block X. If tile 118 cannot find an indication regarding the cache storing data block in location hit table 117, tile 118 may be configured to send a request to the directory for data block X. Similarly, if tile 118 made a request to the tile indicated in new location hit table 117 and the pertinent data block is not stored in the indicated tile, tile 118 may be configured to send a request to the directory for data block X. New location hint table 117 need not affect cache coherence implementations using directory 114.

Among other possible benefits, system 100 may allow each tile to use a cache larger that what is present in each tile. An aggregated cache may comprise caches from a plurality of tiles that may or may not be neighbors of the tile. The aggregated cache may indicate that less cache misses may occur and less requests for data blocks off the die. A larger aggregated cache may also mean that more data may be stored in a cache and less chance of requested data evicting other needed data stored in a cache. A larger aggregated cache also may mean that multiple pieces of data need not compete for space in a single, perhaps smaller, cache.

As caches of neighbor tiles may be used, access times may remain low. A system in accordance with at least some principles of this disclosure may be implemented by making minor changes to existing cache coherence protocols. If information becomes stale, a cache directory may still be used to locate cached data. Access latency to data in cache and on chip network traffic may be reduced as a result of data being stored in cache that is in close physical proximity to requesting processors and/or because processors may less frequently access cache directories at tiles distributed throughout the die.

Figure 5:
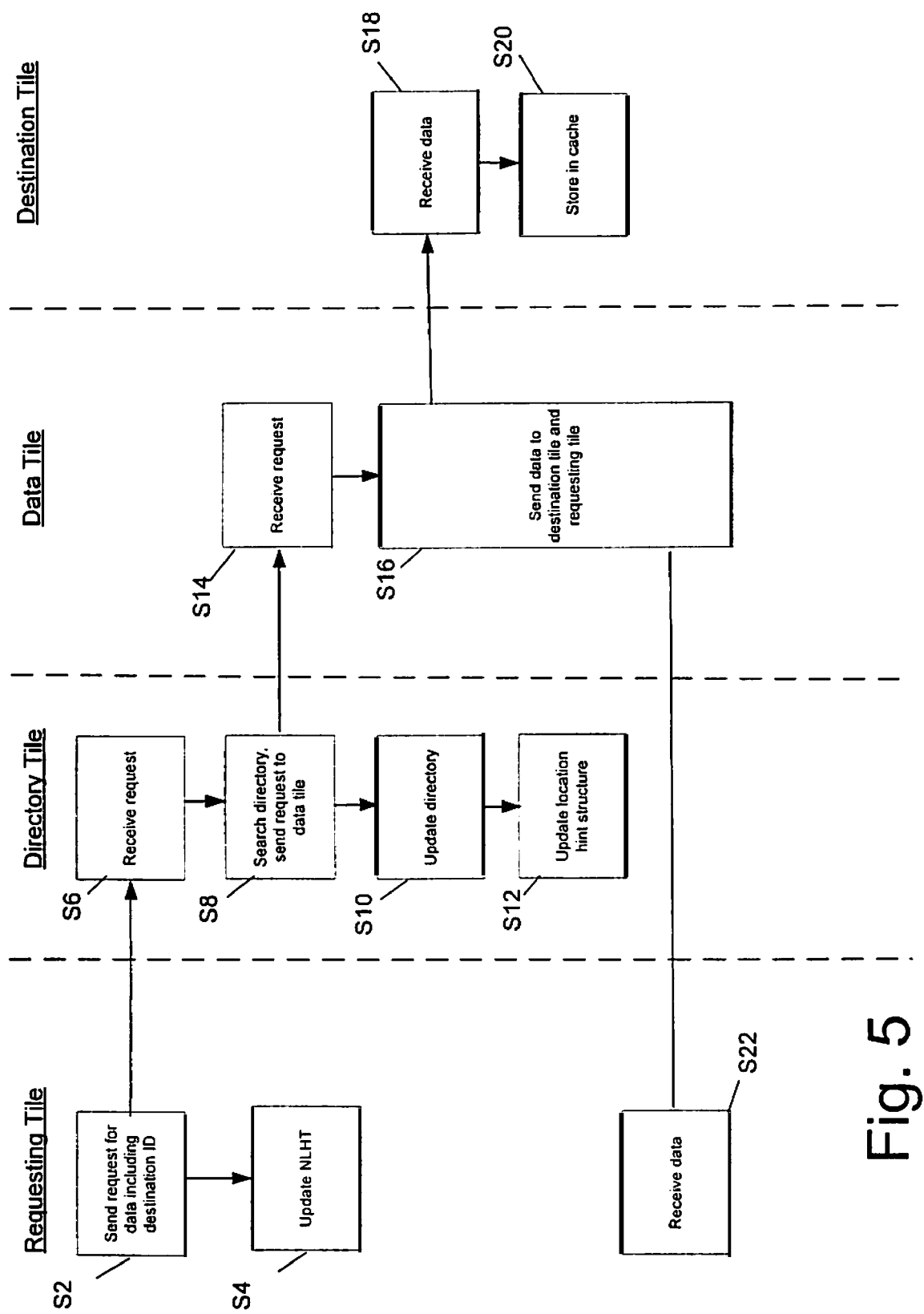
FIG. 5 depicts a flow diagram for an example process for data storage and access in a multi-core processor architecture.

FIG. 5 depicts a flow diagram for an example process for data storage and access in a multi-core processor architecture that is arranged in accordance with at least some embodiments of the present disclosure. In some examples, the process in FIG. 5 could be implemented using system 100 discussed above. An example process may include one or more operations, actions, or functions as illustrated by one or more of blocks S2, S4, S6, S8, S10, S12, S14, S16, S18, S20 and/or S22. Although illustrated as discrete blocks, various blocks may be divided into additional blocks, combined into fewer blocks, or eliminated, depending on the desired implementation. Processing may begin at block S2.

At block S2 a requesting tile can be adapted to send or initiate a request for a data block to a directory tile. The request may include a destination identifier indicating a tile for the requesting tile to store the data block. The directory tile includes a directory for the requested data block. In some examples, the destination tile may be in a tile that is a neighbor (e.g., a tile that is adjacent to or in close physical proximity therewith) of the requesting tile. Processing may continue from block S2 to block S4. Processing may also continue from block S2 to block S6.

At block S4 the processor in the requesting tile may be adapted to update a near location hint table to indicate that the data block may be stored in the cache of a tile corresponding to the destination identifier.

At block S6 the directory tile may be arranged to receive the request from the requesting tile. Processing may continue from block S6 to block S8.

At block S8 the directory tile may be arranged to search the directory for the appropriate data tile storing the data block and may send the received request to the data tile. Processing may continue from block S8 to block S10. Processing may also continue from block S8 to block S14.

At block S10 the directory tile may be adapted to update the directory to indicate that the data block is now stored in the tile corresponding to the destination identifier. Processing may continue from block S10 to block S12.

At block S12 the directory tile may be adapted to update a location hint structure to indicate that the data block is now stored in the tile corresponding to the destination identifier. The location hint structure can be used to determine a location of the data block before the directory is searched.

At block S14 the data tile may be adapted to receive the request from the directory tile. Processing may continue from block S14 to block S16.

At block S16 the data tile may be adapted to send the data block to the destination tile and to the requesting tile. Processing may continue from block S16 to blocks S18 and S22. At block S22 the requesting processor may be adapted to receive the data block.

At block S18 the destination tile may be adapted to receive the data block. Processing may continue from block S18 to block S20.

At block S20 the destination tile may be adapted to store the data block in a cache.

Figure 6:
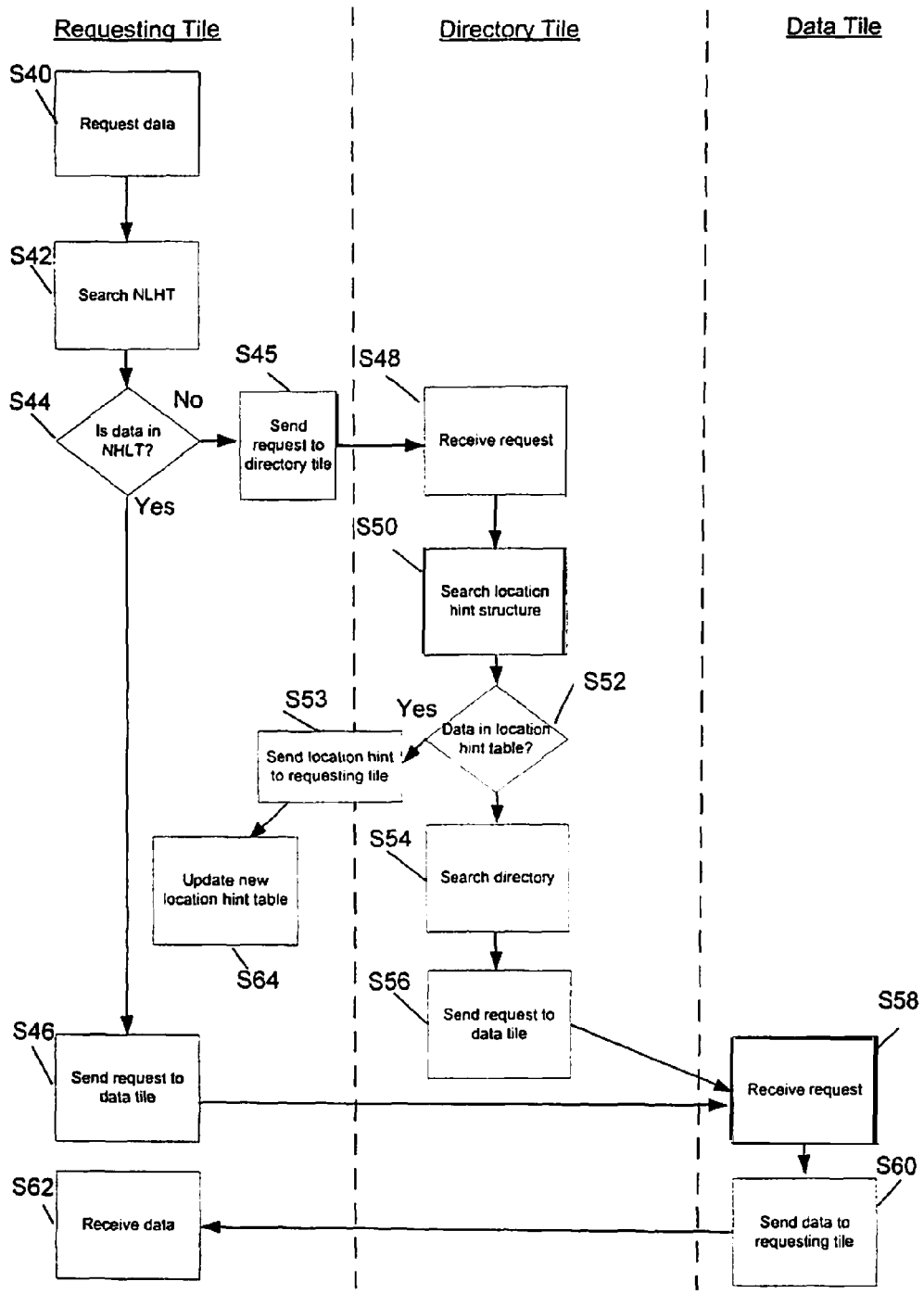
FIG. 6 depicts a flow diagram for an example process for data storage and access in a multi-core processor architecture.

FIG. 6 depicts a flow diagram for an example process for data storage and access in a multi-core processor architecture that is arranged in accordance with at least some embodiments of the present disclosure. The process in FIG. 6 could be implemented using, for example, system 100 discussed above. An example process may include one or more operations, actions, or functions as illustrated by one or more of blocks S40, S44, S45, S46, S48, S50, S52, S53, S54, S56, S58, S60, and/or S62. Although illustrated as discrete blocks, various blocks may be divided into additional blocks, combined into fewer blocks, or eliminated, depending on the desired implementation. Processing may begin at block S40.

At block S40, if the requesting tile does not find a data block in its local cache, the requesting tile may be configured to request access to a data block stored in a cache outside of the requesting tile. Processing may continue from block S40 to block S42.

At block S42, the requesting tile may be configured to search a new location hint table to see if the data block is indexed in the table. Processing may continue from block S42 to block S44.

At block S44, a query can be made whether the requested data block is indexed in the near location hint table. When the data block is determined to be indexed in the near location hint table ("Yes"), processing may continue from block S44 to block S46. In some examples, blocks S45 and S46 may be performed in parallel in order to minimize the latency of accessing the directory in case the data block is not found in the data tile. Otherwise, when a determination is made that the data block is not indexed in the near location hint table ("No"), or if the location indexed in the table does not have the data block, processing may continue from block S44 to block S45.

At block S46, the requesting tile may be adapted to send a request to the pertinent data tile. Processing may continue from blocks S45 to block S58.

At block S45, the requesting tile may be adapted to send the request to a directory tile including a directory for the data block. Processing may continue from block S45 to block S48.

At block S48, the directory tile may be adapted to receive the request. Processing may continue from block S48 to block S50.

At block S50, the directory tile may be adapted to search a location hint structure for the data block. Processing may continue from block S50 to block S52.

At block S52, a query may be made to the location hint structure to determine whether the data block is indexed in the location hint structure. When the data block is determined to be indexed in the location hint structure ("Yes"), processing may continue from block S52 to block S53. At block S53, the directory tile may be adapted to send a location hint to the requesting tile. Block S53, may be followed by block S64 where the requesting tile may be effective to update the new location hint table. Processing may continue from block S52 to block S54.

At block S54, the directory tile may be adapted to search the directory for the data tile. Processing may continue from block S54 to block S56.

At block S56, the request may be sent from the directory tile to the data tile. Processing may continue from blocks S53 to block S58.

At block S58, the data tile may be adapted to receive the request from the directory tile. Processing may continue from block S58 to block S60.

At block S60, the data tile may be adapted to send the data block to the requesting tile. Processing may continue from block S60 to block S62.

At block S62, the requesting tile may be adapted to receive the data block from the data tile.

Figure 7:
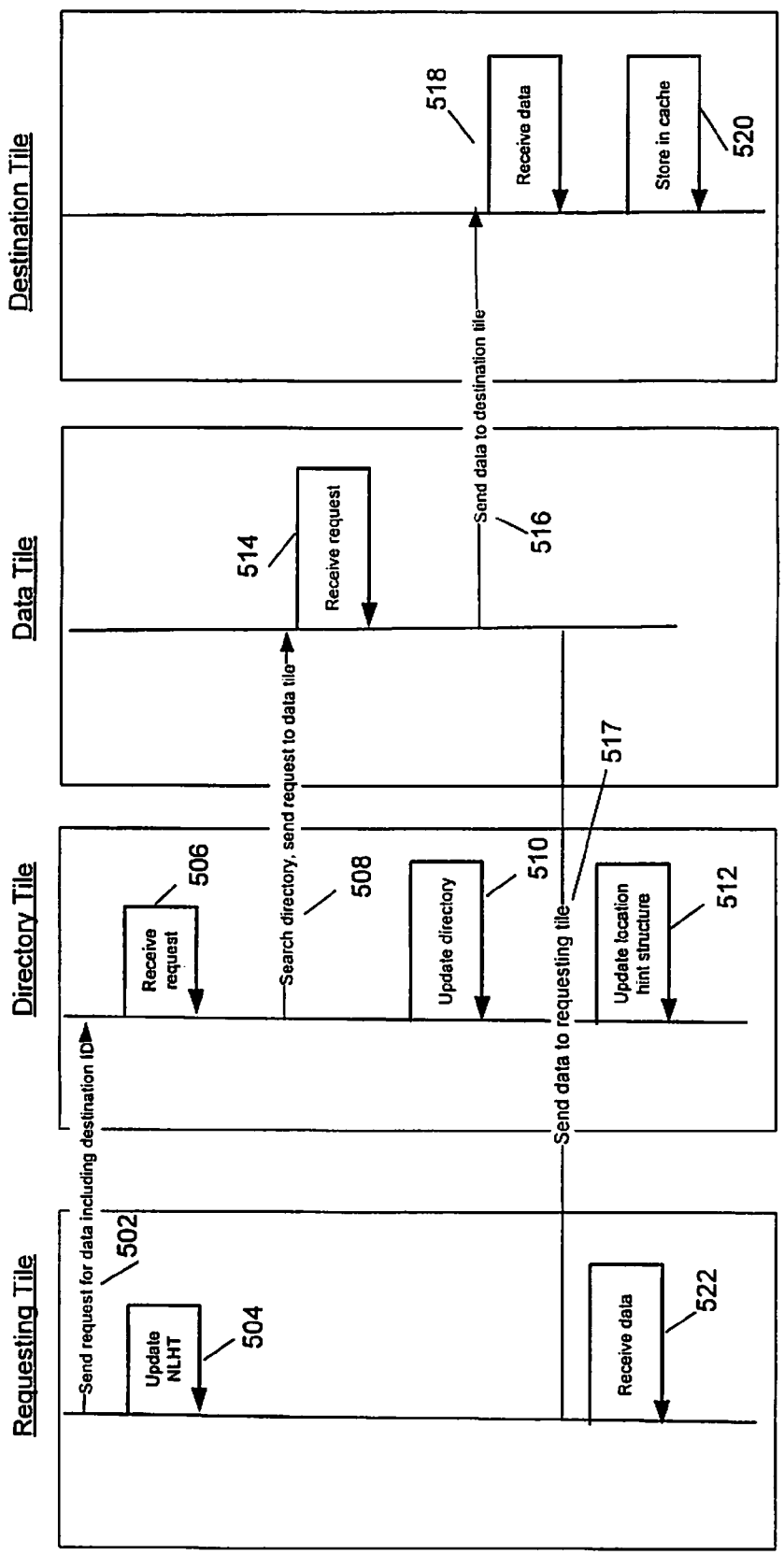
FIG. 7 depicts a signal flow diagram for an example process for performing data storage and access in a multi-core processor architecture.

FIG. 7 depicts a signal flow diagram for an example process for data storage and access in a multi-core processor architecture that is arranged in accordance with at least some embodiments of the present disclosure. In some examples, the process in FIG. 7 may be implemented using system 100 discussed above. An example process may include one or more operations, actions, or functions as illustrated by one or more of operations 502, 504, 506, 508, 510, 512, 514, 516, 517, 518, 520 and/or 522. Although illustrated as discrete operations, various operations may be divided into additional operations, combined into fewer operations, or eliminated, depending on the desired implementation. Processing may begin at operation 502.

At operation 502 a requesting tile can be adapted to send or initiate a request for a data block to a directory tile. The request may include a destination identifier indicating a tile for the requesting tile to store the data block. The directory tile includes a directory for the requested data block. In some examples, the destination tile may be in a tile that is a neighbor of the requesting tile. Processing may continue from operation 502 to operation 504.

At operation 504, the processor in the requesting tile may update a near location hint table to indicate that the data block may be stored in the cache of a tile corresponding to the destination identifier. Processing may continue from operation 502 to operation 506.

At operation 506, the directory tile may be arranged to receive the request. Processing may continue from operation 506 to operation 508.

At operation 508, the directory tile may be arranged to search the directory for the appropriate data tile storing the data block and may send the request to the data tile. Processing may continue from operation 508 to operation 510 and operation 514.

At operation 510, the directory tile may be adapted to update the directory to indicate that the data block is now stored in the tile corresponding to the destination identifier. Processing may continue from operation 510 to operation 512.

At operation 512, the directory tile may be adapted to update a location hint structure to indicate that the data block is now stored in the tile corresponding to the destination identifier. The location hint structure can be used to determine a location of the data block before the directory is searched.

At operation 514, the data tile may be adapted to receive the request from the directory tile. Processing may continue from operation 514 to operations 516 and 517.

At operation 517 the data tile may be adapted to send the data block to the requesting tile. Processing may continue from operation 517 to operation 522 where the requesting processor may be adapted to receive the data block.

At operation 516 the data tile may be adapted to send the data block to the destination tile. Processing may continue from operation 516 to operation 518.

At operation 518, the destination tile may be adapted to receive the data block. Processing may continue from operation 518 to operation 520.

At operation 520, the destination tile may be adapted to store the data block in a cache.

Figure 8:
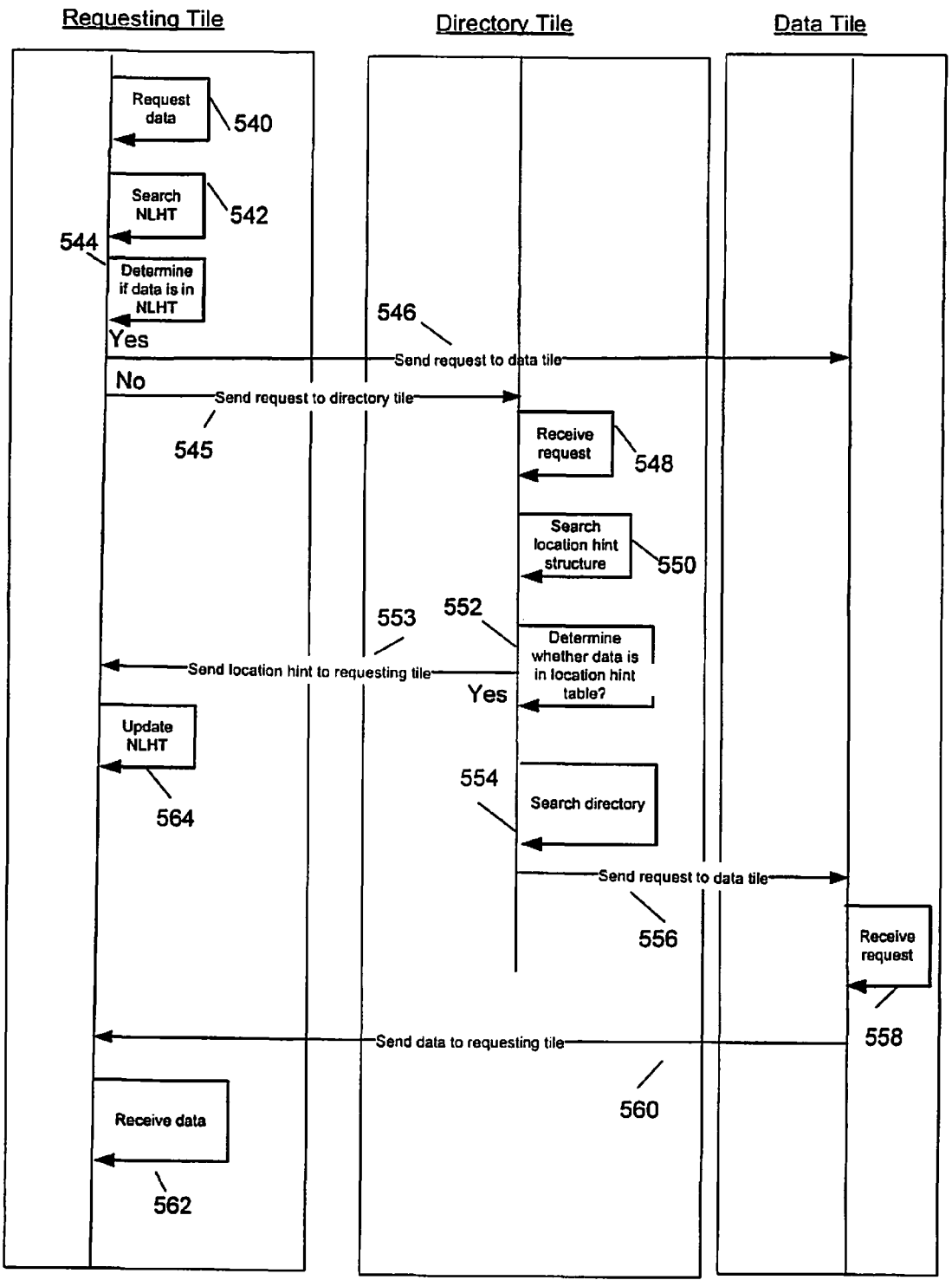
FIG. 8 depicts a signal flow diagram for an example process for performing data storage and access in a multi-core processor architecture.

FIG. 8 depicts a flow diagram for an example process for data storage and access in a multi-core processor architecture that is arranged in accordance with at least some embodiments of the present disclosure. In some examples, the process in FIG. 8 may be implemented using system 100 discussed above. An example process may include one or more operations, actions, or functions as illustrated by one or more of operations 540, 542, 544, 545, 546, 548, 550, 552, 553, 554, 556, 558, 560, and/or 562. Although illustrated as discrete operations, various operations may be divided into additional operations, combined into fewer operations, or eliminated, depending on the desired implementation. Processing may begin at operation 540.

At operation 540, a requesting tile may be configured to request access to a data block stored in a cache outside of the requesting tile. Processing may continue from operation 540 to operation 542.

At operation 542, the requesting tile may be configured to search a new location hint table to see if the data block is indexed in the table. Processing may continue from operation 542 to operation 544.

At operation 544, a query can be made whether the requested data block is indexed in the near location hint table. When the data block is determined to be indexed in the near location hint table ("Yes"), processing may continue from operation 544 to operation 546.

Otherwise, when a determination is made that the data block is not indexed in the near location hint table ("No"), or if the location indexed in the table does not have the data block, processing may continue from operation 544 to operation 545.

At operation 546, the requesting tile may be adapted to send a request to the pertinent data tile. Processing may continue from operations 546 to operation 558.

At operation 545, the requesting tile may be adapted to send the request to a directory tile including a directory for the data block. Processing may continue from operation 545 to operation 548.

At operation 548, the directory tile may be adapted to receive the request from the requesting tile. Processing may continue from operation 548 to operation 550.

At operation 550, the directory tile may be adapted to search a location hint structure for the data block. Processing may continue from operation 550 to operation 552.

At operation 552, a query may be made to determine whether the data block is indexed in the location hint structure. When the data block is determined to be indexed in the location hint structure ("Yes"), processing may continue from operation 552 to operation 553. At operation 553, the directory tile may be adapted to send a location hint to the requesting tile. Operation 553 may be followed by operation 564 where the requesting tile may be effective to update the new location hint table.

Processing may continue from operation 552 to operation 554.

At operation 554, the directory tile may be adapted to search the directory for the data tile. Operation 554 can be performed in parallel with operation 548 and 550. Processing may continue from operation 554 to operation 556.

At operation 556, the request received by the directory tile at operation 548 may be sent to the data tile identified at operation 554. Processing may continue from operations 556 to operation 558.

At operation 558, the data tile may be adapted to receive the request from the directory tile. Processing may continue from operation 558 to operation 560.

At operation 560, the data tile may be adapted to send the data block to the requesting tile. Processing may continue from operation 560 to operation 562.

At operation 562, the requesting tile may be adapted to receive the data block from the data tile.

Figure 9:
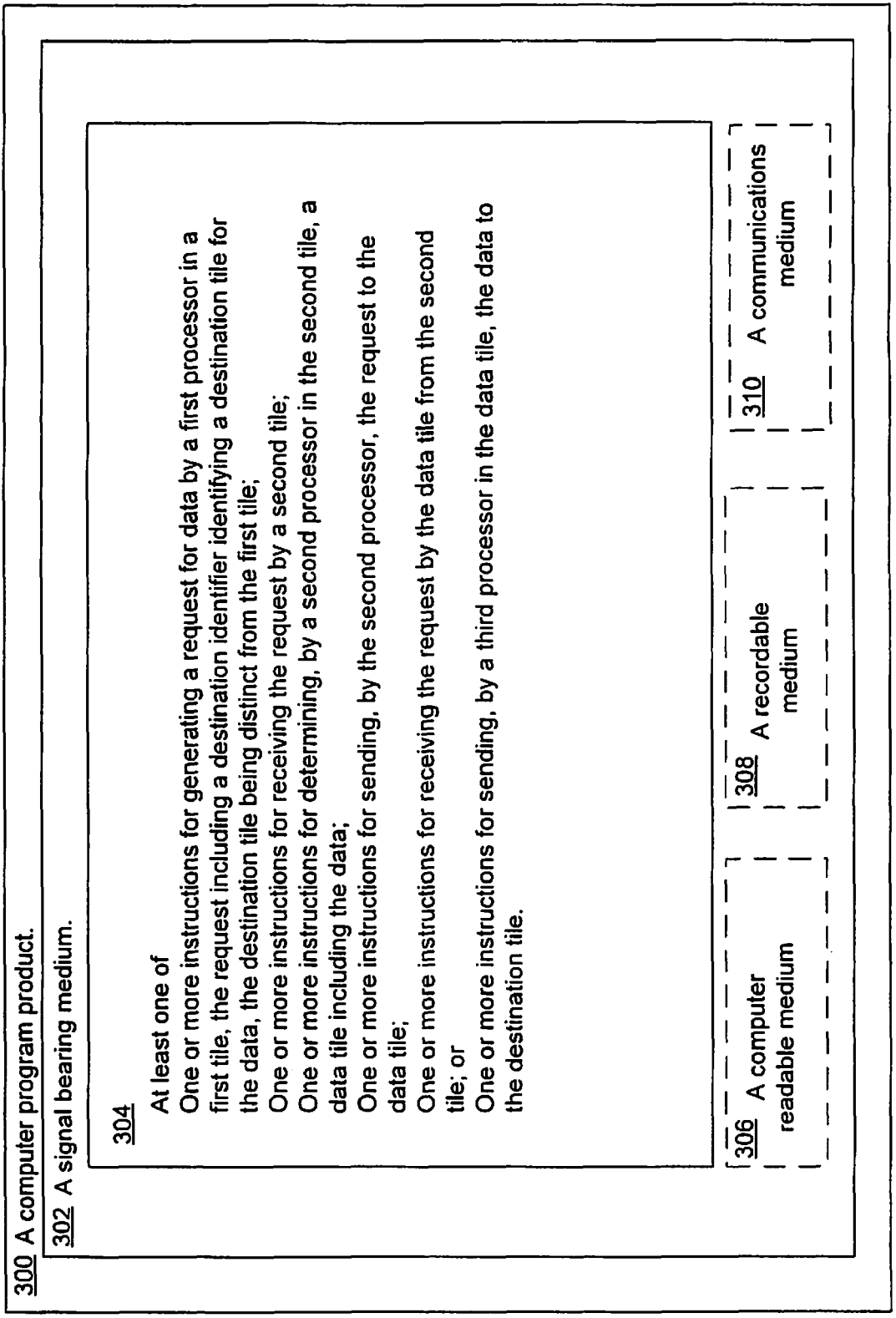
FIG. 9 illustrates a computer program product for performing data storage and access in a multi-core processor architecture.

FIG. 9 illustrates an example computer program product 300 arranged in accordance with at least some examples of the present disclosure. Program product 300 may include a signal bearing medium 302. Signal bearing medium 302 may include one or more instructions 304 that, when executed by, for example, a processor, may provide the functionality described above with respect to FIGS. 1-8. Thus, for example, referring to system 100, one or more of processors 112 in tiles 118, 130-144 may undertake one or more of the blocks shown in FIG. 9 in response to instructions 304 conveyed to the system 100 by medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, program product 300 may be conveyed to one or more modules of the system 100 by an RF signal bearing medium 302, where the signal bearing medium 302 is conveyed by a wireless communications medium 310 (e.g., a wireless communications medium conforming with the IEEE 802.11 standard).

FIG. 10 is a block diagram illustrating an example computing device 400 that is arranged to perform data storage and access in a multi-processor architecture in accordance with at least some embodiments of the present disclosure. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include a data storage and access in a multi-processor architecture algorithm 426 that is arranged to perform the functions as described herein including those described with respect to system 100 of FIG. 2. Program data 424 may include storage and multi-processor architecture data 428 that may be useful for data storage and access in a multi-processor architecture algorithm as is described herein. In some embodiments, application 422 may be arranged to operate with program data 424 on operating system 420 such that a data storage and access in a multi-processor architecture algorithm may be provided. This described basic configuration 402 is illustrated in FIG. 10 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system for sending a data block stored in a cache, the system comprising:
    a first processor in a first tile, the first processor effective to generate a request for a data block in a data tile different from the first tile, the request including a destination identifier that includes an identification of a destination tile for the data block, the destination tile being different from the first tile; and
    a second tile effective to receive the request from the first tile, the second tile effective to-determine a data tile including the data block, the second tile further effective to send the request received from the first tile to the data tile; wherein
    the data tile, is effective to receive the request from the second tile, the data tile further effective to send the data block to the destination tile identified by the destination identifier.

2. The system as recited in claim 1, wherein the first tile further includes a table, the table effective to indicate that the data block is stored in the destination tile.

3. The system as recited in claim 2, wherein:
    the first processor is further effective to generate a second request to access the data block;
    the first processor is effective to search the table to determine if the destination tile is indexed in the table; and
    when the destination tile is determined to be indexed in the table, the first processor is effective to send the second request from the first tile to the destination tile;
    when the destination tile is determined to be absent from the table, the first processor is effective to send the second request from the first tile to the second tile.

4. The system as recited in claim 1, wherein the second tile includes a directory for the data block.

5. The system as recited in claim 4, wherein the second tile is further effective to update the directory in the second tile to indicate that the data block is stored in the destination tile.

6. The system as recited in claim 5, wherein the second tile is further effective to update a location hint table in the second tile distinct from the directory, the location hint table effective to indicate that the data block is stored in the destination tile.

7. The system as recited in claim 6, wherein:
    the first processor is further effective to generate a second request to access the data block;
    the first processor is effective to send the second request from the first tile to the second tile;
    the second the is further effective to search the location hint table in the second tile to determine if the destination tile is indexed in the location hint table;
    when the destination tile is determined to be indexed in the location hint table, the second tile is effective to send a location hint from the second tile to the first tile; and
    the second tile is effective to search the directory and send the second request to the destination tile.

8. The system as recited in claim 3, wherein:
the second tile is further effective to search the location hint table to determine if the destination tile is indexed in the location hint table;
when the destination tile is determined to be indexed in the location hint table, the second tile is effective to send the second request from the directory tile to the destination tile;
when the destination tile is determined to be absent from the location hint table, the second tile is effective to search the directory and send the second request from the second tile to the destination tile.

9. The system as recited in claim 1, wherein the destination the is located one or two network hops from the requesting, tile.

10. The system as recited in claim 1, wherein:
the data block stored in the data tile has a first priority level;
the data block stored in the first tile has a second priority level; and
the first and second priority levels are different.

11. The system as recited in claim 1, wherein:
the first tile is in a first die;
the destination tile is in a second die; and
the first and second dies are different.

12. The system as recited in claim 11, wherein the second tile is in the first die.

13. The system as recited in claim 2, wherein the table is effective to indicate that a plurality of related data blocks are stored in the destination tile.

14. The system as recited in claim 1, wherein the first processor is inhibited from storing data in the destination tile beyond a threshold.

15. A method for sending a data block stored in a cache, the method comprising:
generating a request for a data block in a data tile by a first processor in a first tile, the request including a destination identifier that includes an identification of a destination tile for the data block, the destination tile being different from the first tile, the data tile being different from the first tile;
receiving the request by a second tile from the first tile;
determining, by a second processor in the second tile, the data tile including the data block;
sending, by the second processor, the request received from the first tile to the data tile;
receiving the request by the data tile from the second tile; and
sending, by third processor in the data tile, the data block to the destination tile identified by the destination identifier.

16. The method as recited in claim 15, further comprising updating a table in the first tile to indicate that the data block is stored in the destination tile.

17. The method as recited in claim 16, further comprising:
generating a second request by the first to access the data block;
searching, by the first processor, the table to determine if the destination tile is indexed in the table; and
when the destination tile is determined to be indexed in the table, sending by the first processor the second request from the first tile to the destination tile;
when the destination tile is determined to be absent from the table, sending by the first processor the second request from the first tile to the second tile.

18. The method as recited in claim 17, further comprising updating by the second processor a directory in the second the to indicate that the data block is stored in the destination tile.

19. The method as recited in claim 18, further comprising the second processor updating a location hint table in the second tile distinct from the directory, the location hint table effective to indicate that the data block is stored in the destination tile.

20. The method as recited in claim 19, further comprising:
searching, by the second processor, the location hint table to determine if the destination tile is indexed in the location hint table;
when the destination tile is determined to be indexed in the location hint table, sending, by the second processor, a location hint from the second tile to the first tile; and
searching, by the second processor the directory, and sending by the second processor the second request from the second tile to the destination tile.

21. A computer storage medium having computer-executable instructions stored thereon which, when executed by a computer, adapt the computer to perform the method comprising:
generating a request for a data block in a data tile by a first processor in a first tile, the request including a destination identifier that includes an identification of a destination tile for the data block, the destination tile being different from the first tile, the data tile being different from the first tile;
receiving the request by a second tile from the first tile;
determining, by a second processor in the second tile, the data tile including the data block;
sending, by the second processor, the request received from the first tile to the data tile;
receiving the request by the data tile from the second tile; and
sending, by a third processor in the data tile, the data block to the destination tile identified by the destination identifier.

22. The computer readable medium as recited in claim 21, further comprising updating a table in the first tile to indicate that the data block is stored in the destination tile.

23. The computer readable medium as recited in claim 22, further comprising:
generating a second request by the first processor to access the data block;
searching, by the first processor, the table to determine if the destination tile is indexed in the table; and
when the destination tile is determined to be indexed in the table, sending by the first processor the second request from the first tile to the destination tile;
when the destination tile is determined to be absent from the table, sending by the first processor the second request from the first tile to the second tile.

24. A the in a multi-processor architecture, the tile comprising:
a processor, the processor effective to generate a first request for a data block in a data tile different from the tile including the processor, the first request including a destination identifier that includes an identification of a destination tile for the data block, the destination tile being distinct different from the tile including the processor;
the processor effective to send the first request from the tile including the processor to a second tile;
a table, the table effective to indicate that the data block is stored in the destination tile;
the processor further effective to generate a second request to access the data block;
the first processor effective to search the table to determine if the destination tile is indexed in the table; and when the destination tile is determined to be indexed in the table, the processor is effective to send the second request from the tile including the processor to the destination tile;

when the destination tile is determined to be absent from the table, the processor is effective to send the second request from the tile including the processor to the second tile.

25. The tile as recited in claim 24, wherein when the destination tile is determined to be absent from the table, the processor is further effective to receive the data block from the destination tile.

* * * * *

UNITED STATES PATENT AND TRADEMARK OFFICE
CERTIFICATE OF CORRECTION

PATENT NO. : 8,244,986 B2
APPLICATION NO. : 12/649659
DATED : August 14, 2012
INVENTOR(S) : Solihin Page 1 of 2

It is certified that error appears in the above-identified patent and that said Letters Patent is hereby corrected as shown below:

In Fig. 6, Sheet 6 of 10, for Tag "S44", Line 2, delete "NHLT?" and insert -- NLHT? --, therefor.

In Fig. 10, Sheet 10 of 10, below "PROCESSOR (404)", Line 1, delete "uP/uC" and insert -- $\mu P/\mu C$ --, therefor.

In Fig. 10, Sheet 10 of 10, delete "COMMUNICATION DEVICES (444)" and insert -- COMMUNICATION DEVICES (446) --, therefor.

In Column 4, Lines 12-35, delete "Near .... Tile." and insert -- In some examples, requesting tile 118 may be configured to make a similar request 180a for data block Y. A directory for data block Y may be stored in cache 152 of directory tile 132. Request 180a may include a destination identifier of neighboring cache 150 or 154. Tile 132 may be configured to receive request 180a, search directory 114 of tile 132, and send request 180a to data tile 135 where data block Y is stored. Tile 135 may be configured to send 184 data block Y to either or both of caches 150,154 in destination tiles 130,134. From there, data may be forwarded to the requesting processor 112 in tile 118. --, therefor.

In Column 4, Line 43, delete "new location" and insert -- near location --, therefor at each occurrence throughout the specification. (Also Lines 49, 54, 55 & 57)

In Column 4, Line 45, delete "New location" and insert -- Near location --, therefor at each occurrence throughout the specification. (Also Lines 53, 61 & 63)

In Column 5, Line 54, delete "level." and insert -- level --, therefor.

In Column 6, Line 1, delete "out)." and insert -- out. --, therefor.

In Column 14, Line 24, in Claim 1, delete "to-determine" and insert -- to determine --, therefor.

Signed and Sealed this
Eighth Day of January, 2013

David J. Kappos
*Director of the United States Patent and Trademark Office*

CERTIFICATE OF CORRECTION (continued)
U.S. Pat. No. 8,244,986 B2

In Column 14, Line 28, in Claim 1, delete "tile," and insert -- tile --, therefor.

In Column 14, Line 60, in Claim 7, delete "the is" and insert -- tile is --, therefor.

In Column 15, Line 14, in Claim 9, delete "the is" and insert -- tile is --, therefor.

In Column 15, Line 55, in Claim 17, delete "first to" and insert -- first processor to --, therefor.

In Column 15, Lines 66-67, in Claim 18, delete "the to" and insert -- tile to --, therefor.

In Column 16, Line 36, in Claim 22, delete "computer readable" and
insert -- computer storage --, therefor.

In Column 16, Line 39, in Claim 23, delete "computer readable" and
insert -- computer storage --, therefor.

In Column 16, Line 51, in Claim 24, delete "the in" and insert -- tile in --, therefor.

In Column 16, Line 58, in Claim 24, delete "distinct different" and insert -- different --, therefor.